(12) United States Patent
Chou

(10) Patent No.: US 7,942,717 B2
(45) Date of Patent: May 17, 2011

(54) BRICK ASSEMBLY WITH AUTOMATICALLY RECOGNIZING CONNECTING RELATIONSHIPS

(76) Inventor: Ting-Shuo Chou, Taipei (TW)

( * ) Notice: Subject to any disclaimer, the term of this patent is extended or adjusted under 35 U.S.C. 154(b) by 401 days.

(21) Appl. No.: 12/335,477

(22) Filed: Dec. 15, 2008

(65) Prior Publication Data

US 2010/0151738 A1 Jun. 17, 2010

(51) Int. Cl.
*A63H 33/10* (2006.01)
(52) U.S. Cl. .............. 446/91; 446/85; 446/122
(58) Field of Classification Search ........... 446/85–128, 446/484; 52/578; 345/420
See application file for complete search history.

(56) References Cited

U.S. PATENT DOCUMENTS

| | | | | |
|---|---|---|---|---|
| 4,275,449 A | * | 6/1981 | Aish | 703/1 |
| 4,556,393 A | * | 12/1985 | Bolli | 446/91 |
| 4,883,440 A | * | 11/1989 | Bolli | 446/91 |
| 5,238,438 A | * | 8/1993 | Glickman | 446/126 |
| 5,919,072 A | * | 7/1999 | Pohlman | 446/95 |
| 6,231,416 B1 | * | 5/2001 | Clever et al. | 446/108 |
| 6,461,215 B1 | * | 10/2002 | Kunz et al. | 446/107 |
| 6,585,553 B1 | * | 7/2003 | Fetridge et al. | 446/91 |
| 7,517,270 B2 | * | 4/2009 | Marzetta | 446/122 |
| 7,736,211 B2 | * | 6/2010 | Marzetta | 446/122 |
| 2002/0196250 A1 | * | 12/2002 | Anderson et al. | 345/420 |
| 2006/0276100 A1 | * | 12/2006 | Glickman | 446/118 |
| 2007/0184722 A1 | * | 8/2007 | Doherty | 439/638 |
| 2007/0262984 A1 | | 11/2007 | Pruss | |
| 2008/0166926 A1 | * | 7/2008 | Seymour et al. | 439/701 |
| 2009/0305602 A1 | * | 12/2009 | Gaute | 446/91 |
| 2010/0311300 A1 | * | 12/2010 | Hansen et al. | 446/91 |

OTHER PUBLICATIONS

3-Dimensional Shape Capture Using Intelligent Blocks as Direct Modeling (2007 IEEE 07695-2801-5/07).

* cited by examiner

*Primary Examiner* — Dmitry Suhol
*Assistant Examiner* — Alex F.R.P Rada, III

(57) ABSTRACT

A brick assembly with automatically recognizing connecting relationships includes a rod brick, a sleeve brick and a frame brick. The rod brick has an irregular polygon-shaped cross-section and an identification IC. The sleeve brick has the internal bore with the same shape with the cross-section of the rod brick to make the rod brick insert into the sleeve brick only in one direction. Also, the sleeve brick is used to connect the rod brick to the frame brick. The signals, caused by the resistor of the sleeve brick, of the identification IC of the frame brick are detected by a computer system to recognize automatically connecting relationships of these bricks.

13 Claims, 9 Drawing Sheets

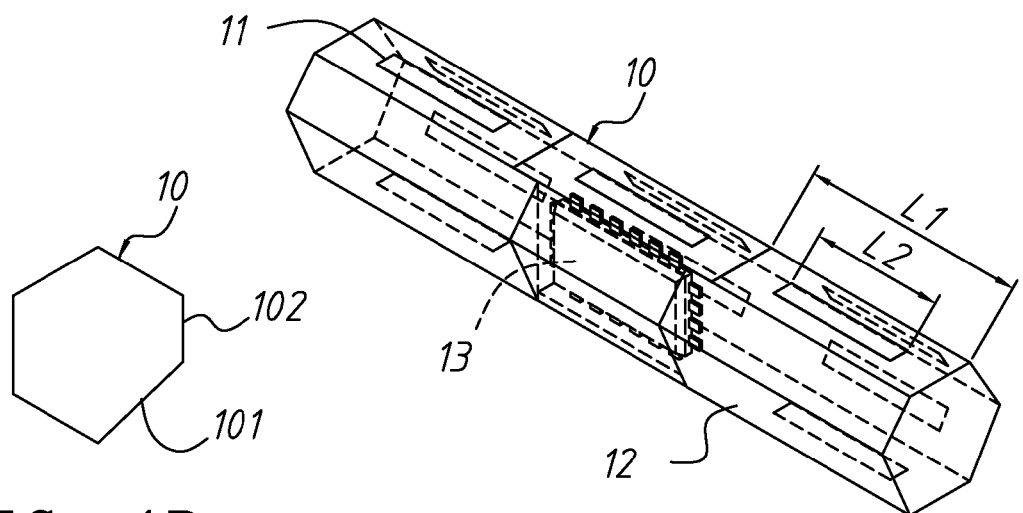
FIG. 1B
FIG. 1A
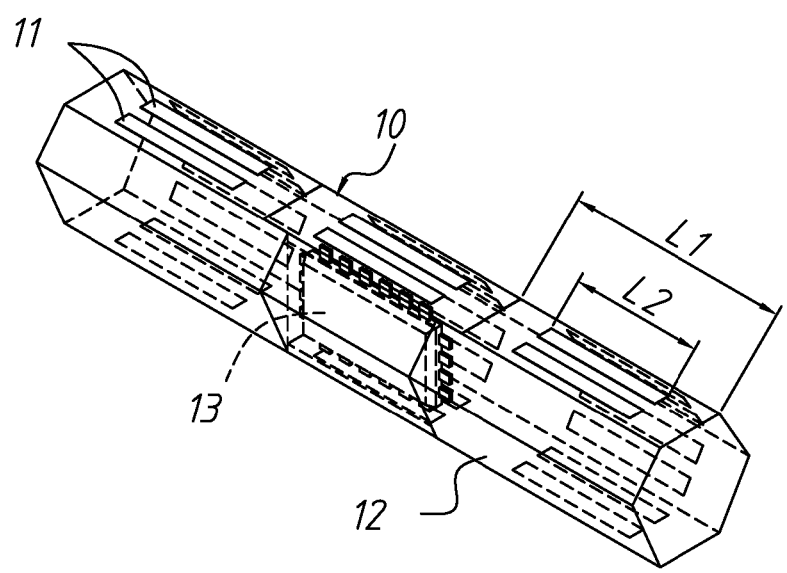
FIG. 1C

BRICK ASSEMBLY WITH AUTOMATICALLY RECOGNIZING CONNECTING RELATIONSHIPS

BACKGROUND OF THE INVENTION

1. Field of Invention

The present invention generally relates to a brick assembly and, more particularly, is a brick assembly with automatically recognizing connecting relationships.

2. Related Art

Toy construction sets includes a plurality of building blocks suitable for creating one or more building block models, e.g. a robot, a creature, a car, an airplane, a building, or the like. Typically, a construction set further includes printed building instructions or assembly instructions that illustrate how to construct a certain model from the building blocks of the set. Nevertheless, it is an interesting feature of such construction sets that they inspire children to create their own models.

The building blocks or the brick assembly are applied in creating 3D images or 3D physical model in recent years. The 3D physical model can perform physical simulation and visual-oriented programming. For example, the US patent application No. 2007/0262984, it is provided a computer-implemented method of generating building instructions for a building block model. However, this is just a computer-implemented method for a virtual building block model. It cannot generate the building instructions for a physical building block model.

Another prior art '3-Dimensional Shape Capture Using Intelligent Blocks as Direct Modeling', OHNO, Masahiro; and DOI, Shigeki, provides a new type 3-dimensional shape capture. It is proposed by directly inputting the structure built with intelligent blocks without using any camera or equipment to capture the shape of the object. The intelligent block developed in this study has CPU and several peripheral ports communicating data among blocks simply connecting blocks, and the connected block structures are directly input to the personal computer as a 3-dimensional image. However, the document is just a conception and does not disclose detailed technology.

SUMMARY OF THE INVENTION

The present invention provides a brick assembly with automatically recognizing connecting relationships. The brick assembly can be recognized by a computer system to recognize automatically connecting relationships of these bricks. Also, the computer system establishes the 3D physical model or physical simulation according to the connecting relationships.

Accordingly, the present invention is directed to a brick assembly, which includes a rod brick, a sleeve brick and a frame brick. The rod brick has an irregular polygon-shaped cross-section. The sleeve brick has a circumferential wall defining an internal bore. The internal bore has the same shape with the cross-section of the rod brick to make the rod brick insert into the sleeve brick only in one direction. The frame brick includes a plurality of through holes for placing the sleeve brick.

Also, the rod brick includes an identification IC and at least one contact connected to the identification IC. The sleeve brick includes at least an inner contact located on the internal bore for contacting the contact of the rod brick when the rod brick inserting into the sleeve brick, an outer contact located on the circumferential wall, and each of the two longitudinal protrusions, locating on opposite sides of a sleeve brick, having two resistors thereon respectively. The frame brick includes an identification IC and each through hole including at least one contact accordance with the outer contact of the sleeve brick. When the rod brick inserts into the sleeve brick and the sleeve brick places in one of the through hole of the frame brick, the contact of the rod brick contacts to the inner contact of the sleeve brick and the contact of the frame brick contacts to the outer contact of the sleeve brick and thus, the connection between identification ICs of the frame brick and the rod brick is established. The signals, caused by the resistor of the sleeve brick and the connection between two identification ICs, of the identification ICs of the rod brick and the frame brick are detected by a computer system to recognize connecting relationship of the rod brick, the sleeve brick and the frame brick.

The cross-section of the rod brick and the internal bore of the sleeve brick are non-symmetrical. Also, the sleeve brick and the frame brick are constrained by the circular rib and the longitudinal protrusion of the sleeve brick and the circular groove and the longitudinal concave of the frame brick. Therefore, the rod brick is inserted into the sleeve brick only in one direction to make the computer system recognize the connecting relationship without being vague. Additionally, the pins of the identification IC of the frame brick connects to different resistors of the sleeve brick will cause different voltage signals. And the identification IC of the rod brick is connects to the identification IC of the frame brick. The computer system detects the identification IC of the frame brick to recognize the connecting relationship by the voltage signals. Moreover, the computer system can establish the 3D physical model or physical simulation according to the connecting relationships.

It is to be understood that both the foregoing general description and the following detailed description are exemplary, and are intended to provide further explanation of the invention as claimed.

BRIEF DESCRIPTION OF THE DRAWINGS

In the following detailed description, reference will be made to the attached drawings in which:

FIG. 1A is a perspective view of a rod brick in accordance with the present invention.

FIG. 1B is a cross-section view of a rod brick in accordance with the present invention.

FIG. 1C is perspective view of the rod brick with different type of the contacts in accordance with the present invention.

DETAILED DESCRIPTION OF THE INVENTION

Figure 2:
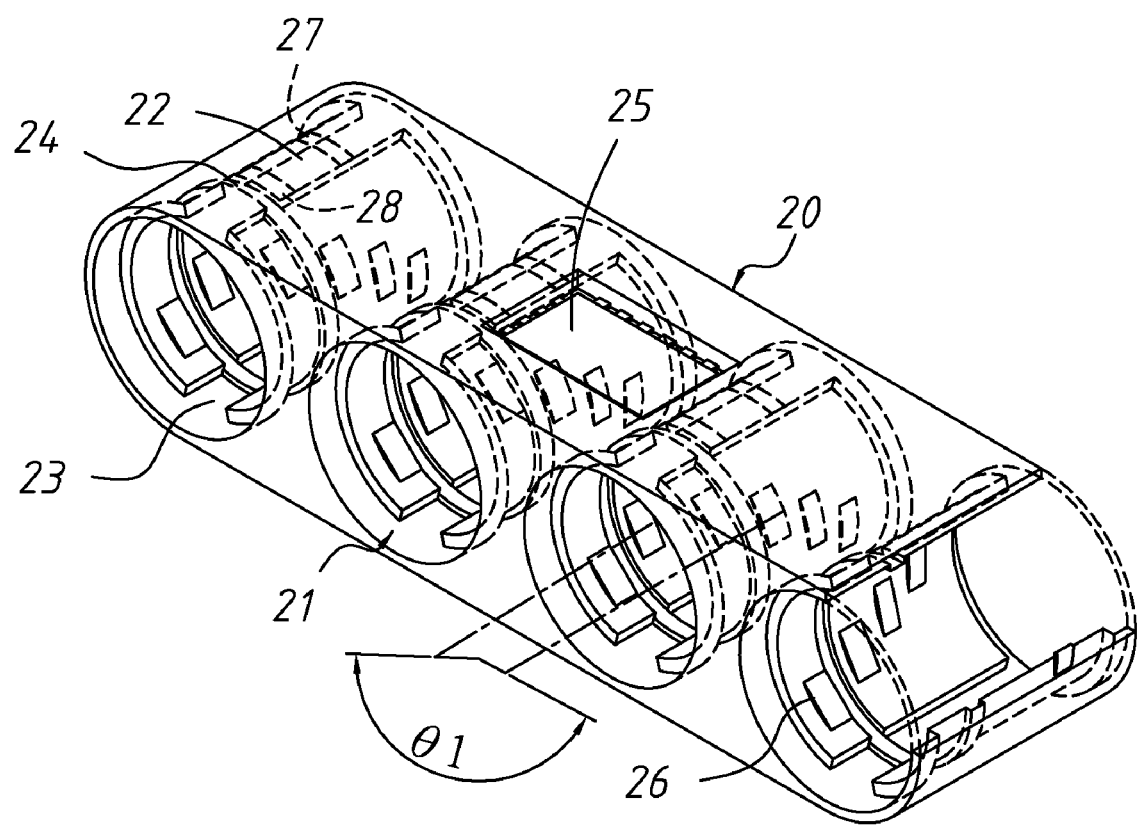
FIG. 2 is a perspective view of a frame brick in accordance with the present invention.

Referring to the drawings, and particularly to FIGS. 1A, 2 and 3A to 3C, there is illustrated a brick assembly of the present invention, which includes a rod brick 10, a frame brick 20 and a sleeve brick 30a, 30b and 30c. The brick assembly can be used to build block models, e.g. a robot, a creature, a car, an airplane, a building, or the like. Also, the computer system detects the identification IC to recognize the connecting relationship by the voltage signals and interconnections among identification ICs. Moreover, the computer system can establish the 3D physical module according to the connecting relationships.

Referring to FIG. 1A, the rod brick 10 is a shaft-like element. The rod brick 10 includes a plurality of rod units 12. Each rod unit 12 has the same length L1 and connects together one by one. The cross-section of the rod brick 10 is an irregular polygon-shaped. Please referring to FIG. 1B, the cross-section of the rod brick 10 is a non-symmetrical hexagon, i.e. the first side 101 is longer than other sides, and the second side 102 is shorter than other sides. However, the shape of the cross-section of the rod brick 10 is not limited to the hexagon as illustrated in FIG. 1B. It is to be appreciated that the hexagon is only one example of a suitable shape and is not intended to suggest any limitation as to the scope of use or functionality of the brick assembly. Those skilled in the art should readily appreciate that shape of the cross-section of the rod brick 10 can be changed in many forms; including, but not limited to: an irregular polygon-shaped, e.g. pentagon or quadrangle; a regular polygon-shaped with a protrusion, e.g. keys or ribs. Also, in FIG. 1A, the rod brick 10 includes three rod units 12. However, it is to be appreciated to have any number of rod units 12.

The rod brick 10 has an identification IC 13 and a plurality of contacts 11 connected to the identification IC 13 and located on the outer surface of the rod brick 10. Also, the length L2 of the contact 11 is a little less than half of the length L1 of the rod unit 12. The rod brick 10 has one contact 11 on one surface as illustrated in FIG. 1A. On the other hand, the rod brick 10 can include two contacts 11 on one surface as illustrated in FIG. 1C.

Please refer to FIG. 2, the frame brick 20 has a plurality of through holes 21. Each through hole 21 includes two opposite longitudinal concaves 22, 23 and a circular groove 24 near one end. Similar, the frame brick 20 includes an identification IC 25 and at least one contact 26 located on the inner surface of the through holes 21, two contacts 27 and 28 located on the longitudinal concaves 22 and connected to the identification IC 25.

The through holes 21 are arranged in-line as illustrated in FIG. 2. It is to be appreciated that the in-line arrangement is only one example of a suitable arrangement and is not intended to suggest any limitation as to the scope of use or functionality of the brick assembly. Those skilled in the art should readily appreciate that the arrangement of the through holes 21 of the frame brick 20 can be changed in many forms; including, but not limited to: arranged in matrix, side by side with an oblique angle, or any other specific type to fit one of the build block models, e.g. a robot, a creature, a car, an airplane, a building, or the like. Also, in FIG. 2, the frame brick 20 includes four through holes 21. However, it is to be appreciated to have any number of through holes 21.

Figure 3A:
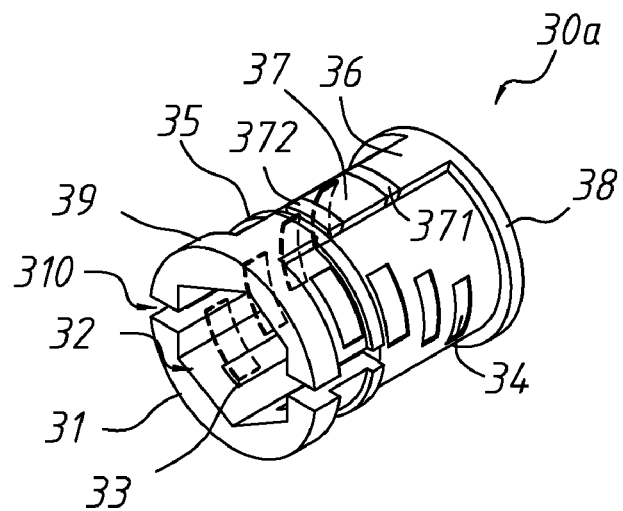
FIGS. 3A to 3C are perspective views of the sleeve bricks in accordance with the present invention.

Referring to FIG. 3A, the sleeve brick 30a is used to connect the rod brick 10 to frame brick 20. The sleeve brick 30a has a circumferential wall 31 defining an internal bore 32. The internal bore 32 has the same shape with the cross-section of the rod brick 10 to make the rod brick 10 insert into the sleeve brick 30a only in one direction. Please also refer to FIGS. 1A and 1B, if the shape of the cross-section of the rod brick 10 is a regular polygon, the rod brick 10 may insert into the sleeve brick 30a in six directions. In actual applied, the rod brick 10 may have some patterns, such as propeller, the head of a robot or a creature, the handler of a car, and etc. That would increase the difficulty for recognizing the connecting relationship. Therefore, the present invention designs the cross-section of the rod brick 10 is an irregular polygon-shaped, and the internal bore 32 has the same shape with the cross-section of the rod brick 10. The rod brick 10 can insert into the sleeve brick 30a only in one direction.

The sleeve brick 30a further includes inner contacts 33, outer contacts 34, a circular rib 35 and two longitudinal protrusions 36. The inner contacts 33 are located on the internal bore 32, and the outer contacts 34 are located on the circumferential wall 31. The circular rib 35 is formed on the circumferential wall 31 and near one end of the sleeve brick 30a. Two longitudinal protrusions 36 locate on two opposite side of the circumferential wall 31 respectively, and each longitudinal protrusions 36 has a resistor 37 thereon. The resistor 37 has a first contact 371 and a second contact 372 at the two ends. For insertion easier, the sleeve brick 30a further has two breaches 310 on one end which the circular rib 35 is near. When placing into the through hole 21 of the frame brick 20, the outer diameter of this end of the sleeve brick 30 can be decreased due to the two breaches 310 to make the sleeve brick 30a place easier.

Figure 4:
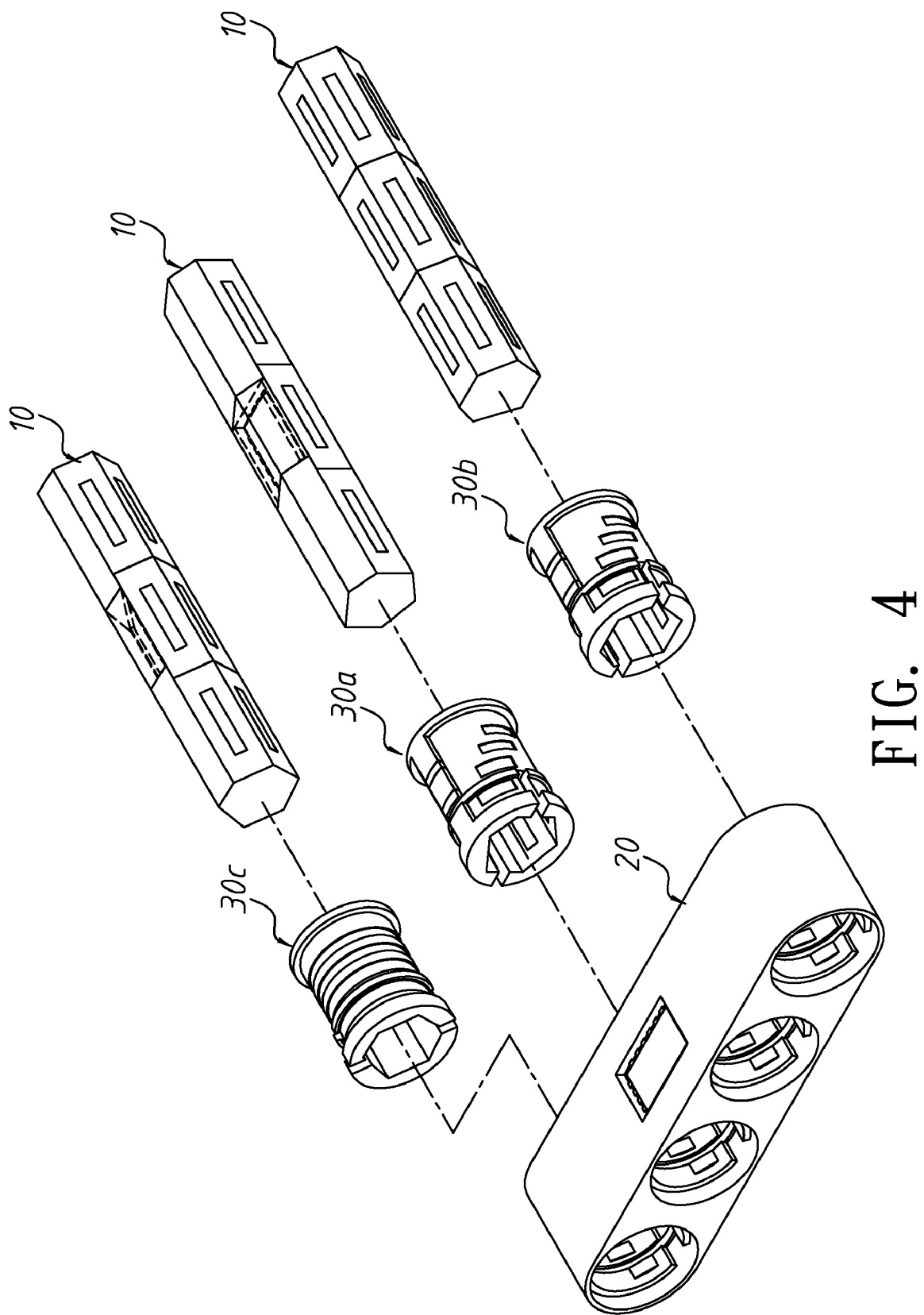
FIGS. 4 and 5 are perspective views of the brick assembly in accordance with the present invention.
Figure 5:
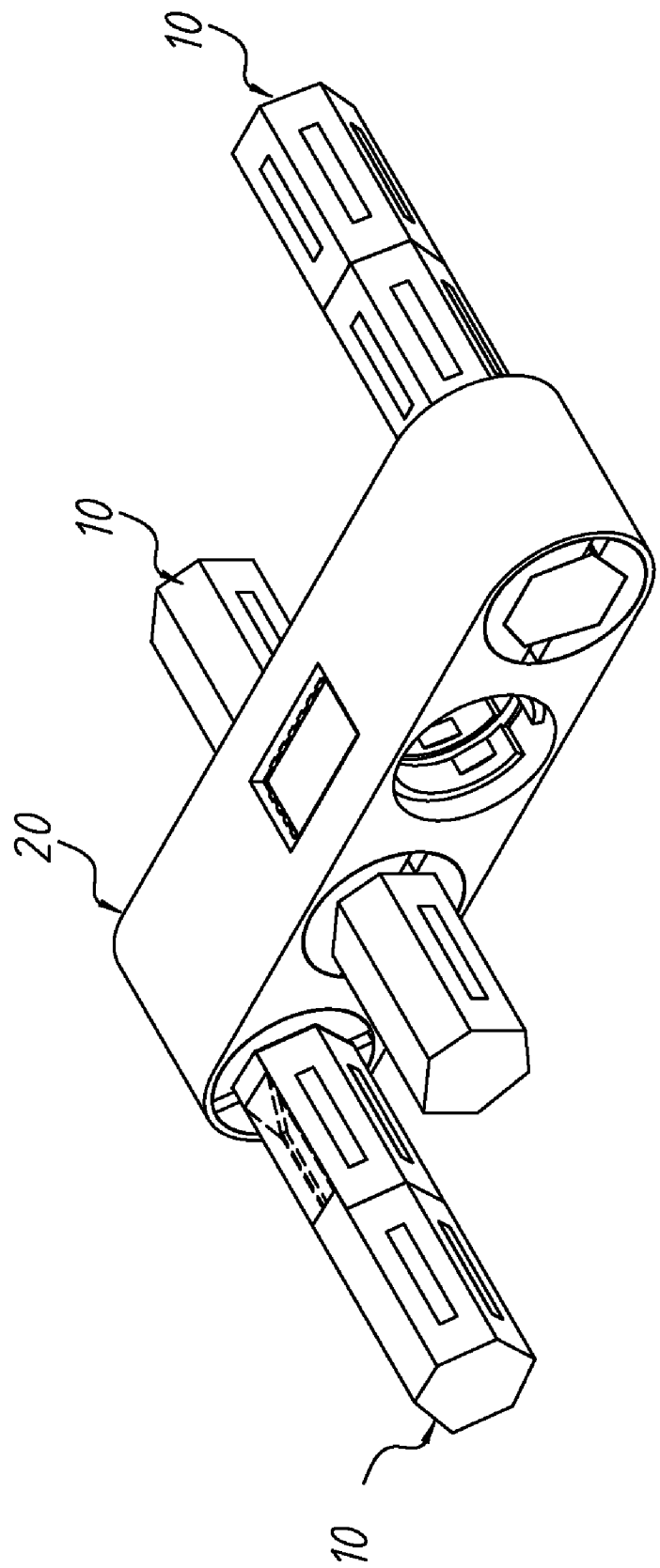

Referring to FIGS. 4 and 5, when the sleeve brick 30a is placed into the through hole 21, the longitudinal protrusions 36 of the sleeve brick 30a have to corresponding to the longitudinal concaves 22 of the frame brick 20. Due to the circular rib 35 is near one end of the sleeve brick 30a and the circular groove 24 near one end of the through hole 21, the sleeve brick 30a only can put into the through hole 21 in one end of the through hole 21 to prevent the sleeve brick 30a to misplace. The sleeve brick 30a further includes two circular rib 38, 39 is formed on two end of the circumferential wall 31 to increase combination firmly after the sleeve brick 30a is put into the through hole 21 of the frame brick. Also, the length of the sleeve brick 30a is equal to the length of the through hole 21 and the length L1 of the rod unit 12 for appearance. Moreover, the end, which the circular rib 35 is near, of the sleeve brick 30a includes two opposite breaches 310 to make the sleeve brick 30a put into the through hole 21 of the frame brick 20 easier.

After the sleeve brick 30a is placed into the through hole 21 of the frame brick 20, the rod brick 10 inserts into the internal bore 32 of the sleeve brick 30a. Because the rod brick 10 only can insert into the internal bore 32 in one direction, the insertion direction is constrained after sleeve brick 30a is placed into the through hole 21 of the frame brick 20. For providing more insertion direction, the present invention includes another type of the sleeve brick 30b, referring to FIG. 3B. The sleeve brick 30a can be placed into the through hole 21 in two directions, due to the two opposite longitudinal concaves 22, 23 of the frame brick 20 and the two longitudinal protrusions 36 of the sleeve brick 30a. If we define the sleeve brick 30a is degree 0, as illustrated in FIG. 3A, the sleeve brick 30a also can be placed into the through hole 21 in degree 180. Therefore, the sleeve brick 30b can be placed into the through hole 21 in degrees 90 and 270. The above degrees are defined depend on the longest side of the irregular polygon-shaped of the rod brick 10 and the sleeve bricks 30a, 30b.

Figure 3B:
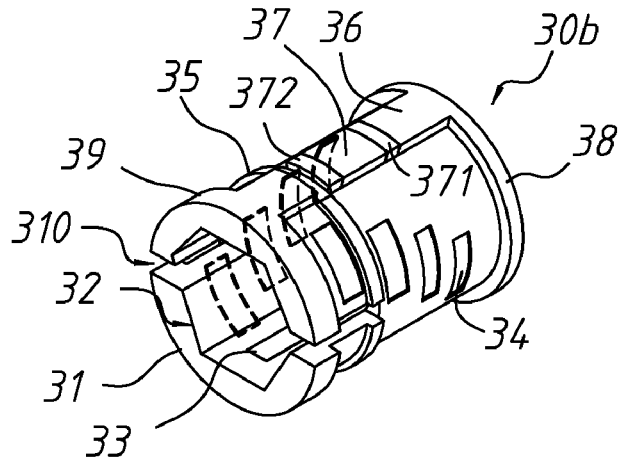
Figure 3C:
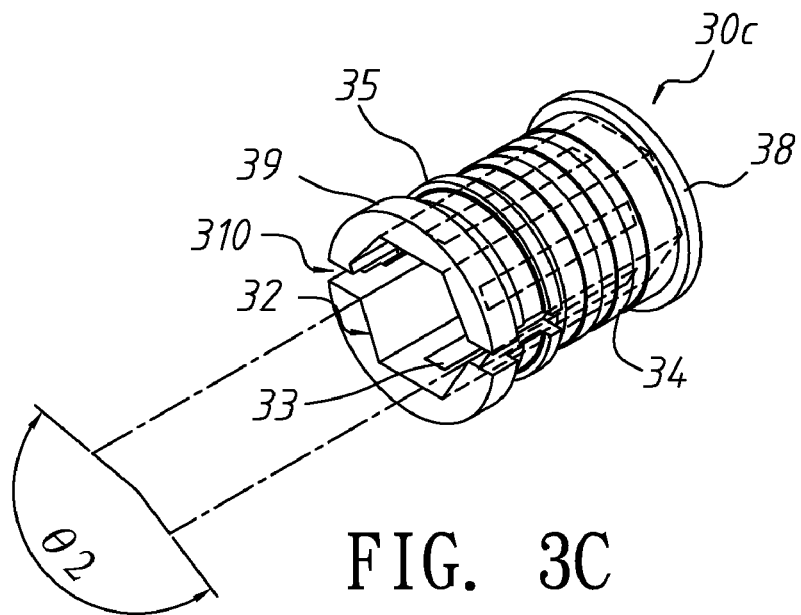
Figure 6:
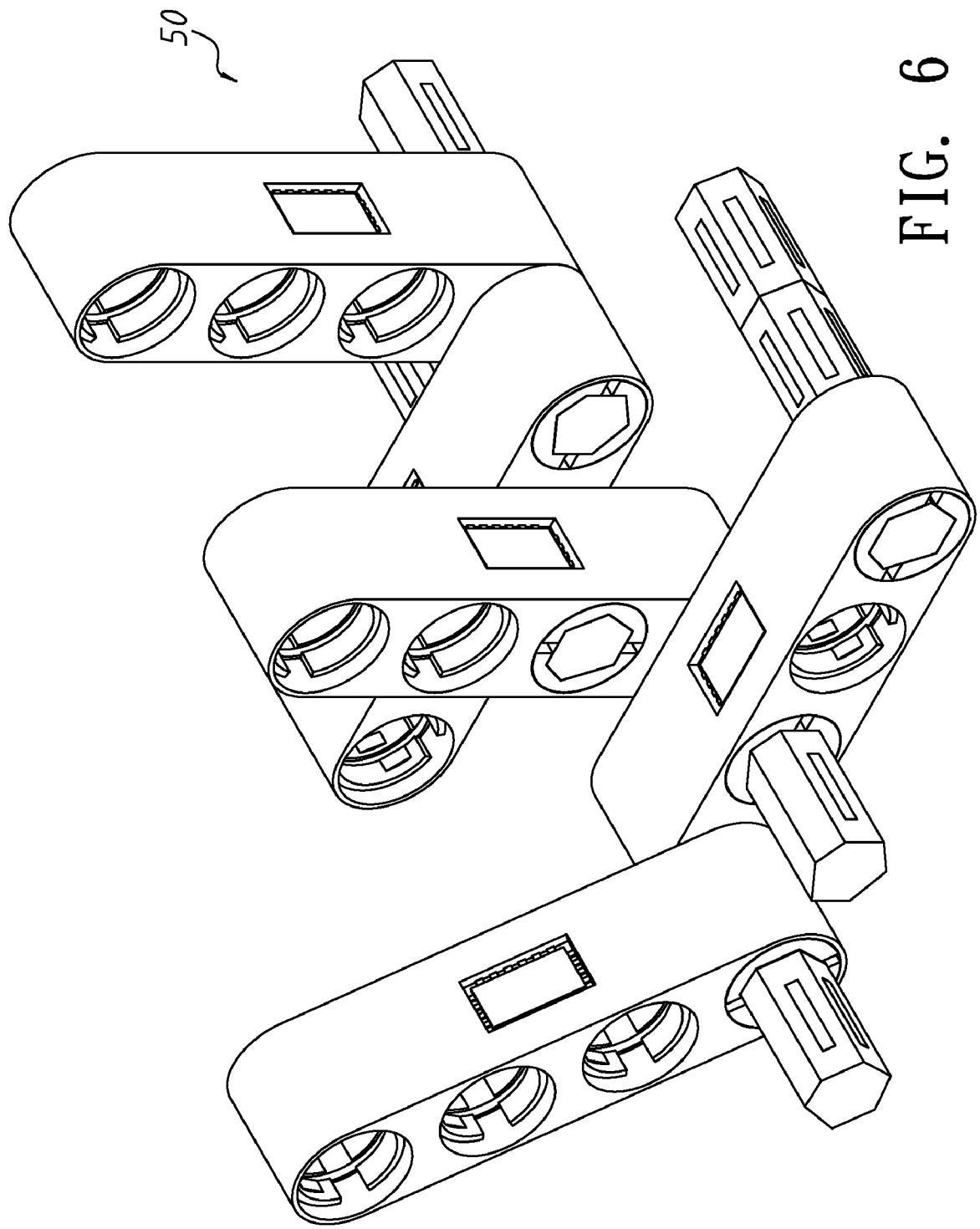
FIG. 6 is a perspective view of the brick assembly using the sleeve bricks in accordance with the present invention

Also, for some conditions, the rod brick 10 need to rotate after combination, such as propeller, the head of a robot, the handler or wheels of a vehicle, and etc. The brick assembly according to the present invention further includes a rotatable sleeve brick 30c. The sleeve brick 30c has the circular ribs 35, 38 and 39 without the two longitudinal protrusions 36. Therefore, when the rod brick 10 inserts into the rotatable sleeve brick 30c and the rotatable sleeve brick 30c places in one of the through hole 21 of the frame brick 20, the rod brick 10 is allowed to rotate respect to the frame brick 20. Due to the rotatable sleeve brick 30c is provided the rod brick 10 to be rotatable, the above degrees are meaningless. The rotatable sleeve brick 30c does not have the resistor 37. Due to the rotatable sleeve brick 30c is rotatable, the outer contacts 34 are encircled rather than chip-type as illustrated in FIGS. 3A and 3B. Therefore, no matter the rotatable sleeve brick 30c is rotated to any directions after placing into the through hole 21 of the frame brick 20, the outer contacts 34 are always connected to the contact 26 of the frame brick 20. On the other hand, when the outer contact 34 is located over the two breaches 310, the angle 1 of the snapped encircled contact 34 should be smaller than the angle 2 of the two contacts 26 in one circle of the frame brick 20 to ensure the outer contacts 34 are always connected to the contact 26 of the frame brick 20. Moreover, the brick assembly 50 also can be constructed any type from the sleeve bricks 30a, 30b, the rotatable sleeve brick 30c, the rod bricks 10 and the frame bricks 20, please refer to FIG. 6.

Figure 3D:
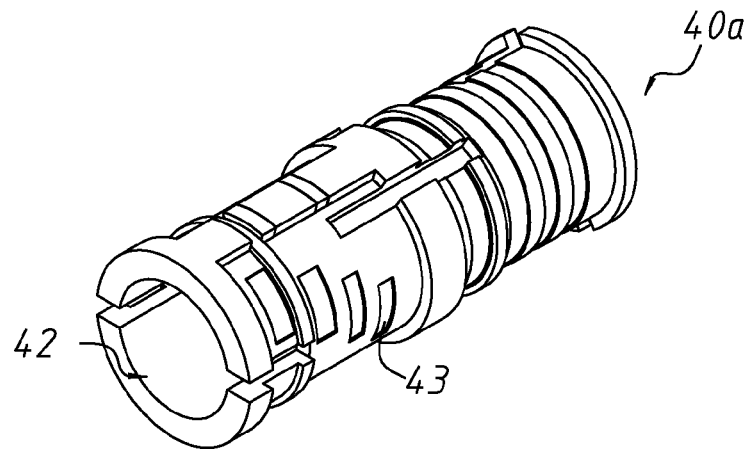
FIGS. 3D to 3F are perspective views of the couple sleeve bricks in accordance with the present invention.
Figure 3E:
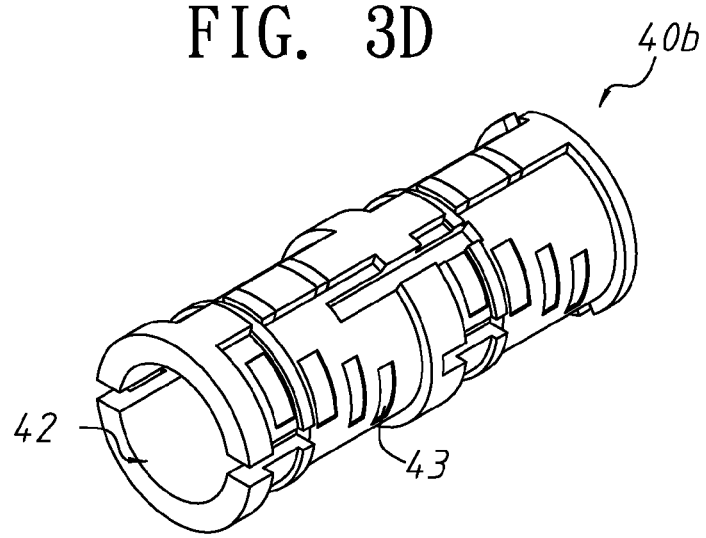
Figure 3F:
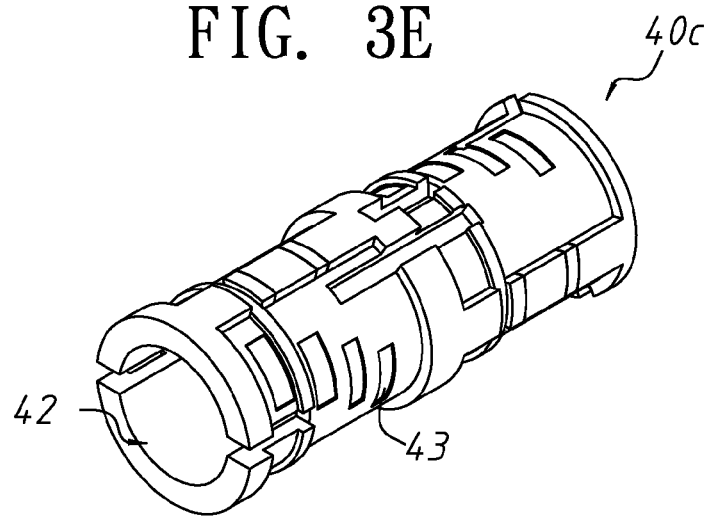

On the other hand, for only connects two frame bricks 20, the invention further includes a couple sleeve brick 40a, 40b and 40c, referring to FIGS. 3D to 3F. The couple sleeve brick 40a, 40b and 40c are combined any two of the rotatable sleeve brick 30c and the sleeve brick 30a, 30b, but with different shape of the internal bore 42. Because when the couple sleeve brick 40a, 40b or 40c connects to two frame bricks 20, the identification ICs 25 of the two frame bricks 20 are connected to the resistor of the couple sleeve brick 40a, 40b or 40c to recognize. If the rod brick 10 is inserted into the internal bore 42 of the couple sleeve brick 40a, 40b or 40c now, it will cause erroneous recognition easily. To avoid this condition, the internal bore 42 of the couple sleeve brick 40a, 40b and 40c have different shape with the cross-section of the rod brick 10. Therefore the couple sleeve brick 40a, 40b and 40c only have the outer contacts 43 on the outer surface, but without any contacts in the inner surface of the internal bore 42. As referring to FIGS. 3D to 3F, the shape of the internal bore 42 is circle. However, the shape of the cross-section of the internal bore 42 is not limited to circle as illustrated in FIGS. 3D to 3F. It is to be appreciated that the circle is only one example of a suitable shape and is not intended to suggest any limitation as to the scope of use or functionality of the brick assembly. Those skilled in the art should readily appreciate that shape of the cross-section of the internal bore 42 can be changed in many forms to prevent the rod brick 10 to insert.

When the rod brick 10 inserts to the internal bore 32 of the sleeve brick 30a, 30b or 30c, the contacts 11 of the rod brick 10 contact to the inner contacts 33 of the sleeve brick 30a, 30b or 30c. Also, due to the length L2 of the contact 11 is a little less than half of the length L1 of the rod unit 12, the inner contacts 33 of the sleeve brick 30a, 30b or 30c only can contact the contacts 11 of one rod unit 12. When the sleeve brick 30a, 30b or 30c is placed into the through hole 21 of the frame brick 20, the contacts 26 of the frame brick 20 contact to the outer contacts 34 of the sleeve brick 30a, 30b or 30c. The contacts 27 and 28 of the frame brick 20 contact to the first contact 371 and the second contact 372 of the resistor 37 respectively. Therefore, the identification IC 25 of the frame brick 20 connects to the resistors 37 of the sleeve brick 30a, 30b or 30c. The identification IC 13 of the rod brick 10 also connects to the identification IC 25 of the frame brick 20 through the inner contacts 33 of the sleeve brick 30a, 30b or 30c. Hence, the computer system detects the identification IC 25 of the frame brick 20 to recognize the connecting relationship.

Figure 7A:
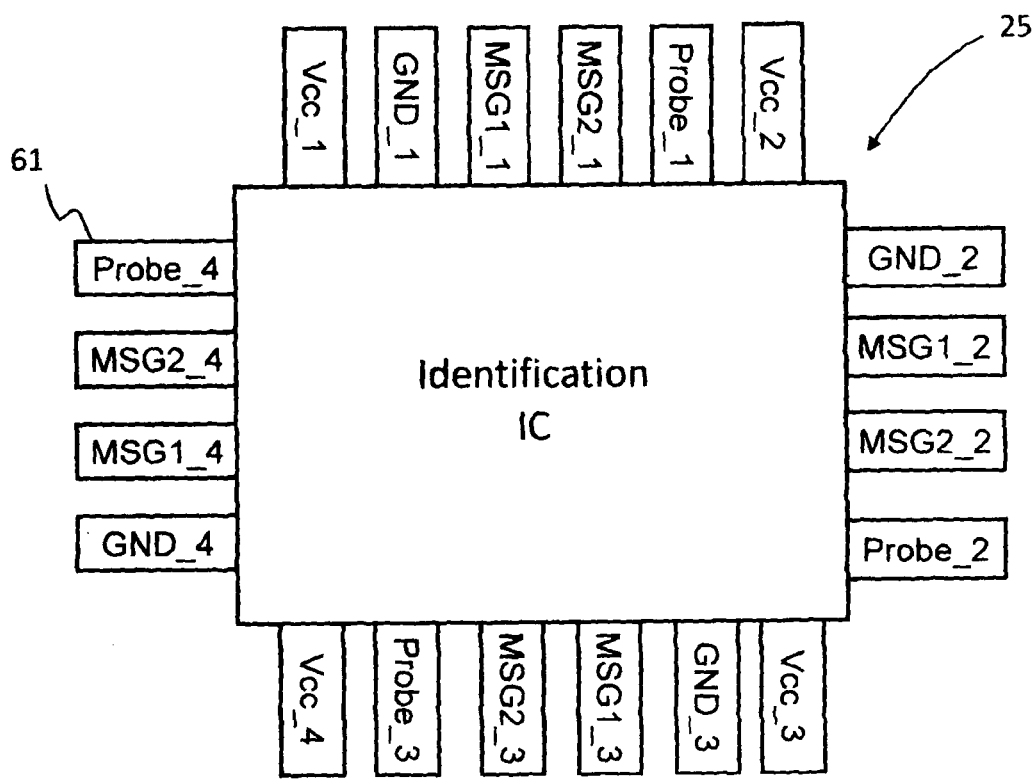
FIGS. 7A and 7B are example views of the identification IC in accordance with the present invention.
Figure 7B:
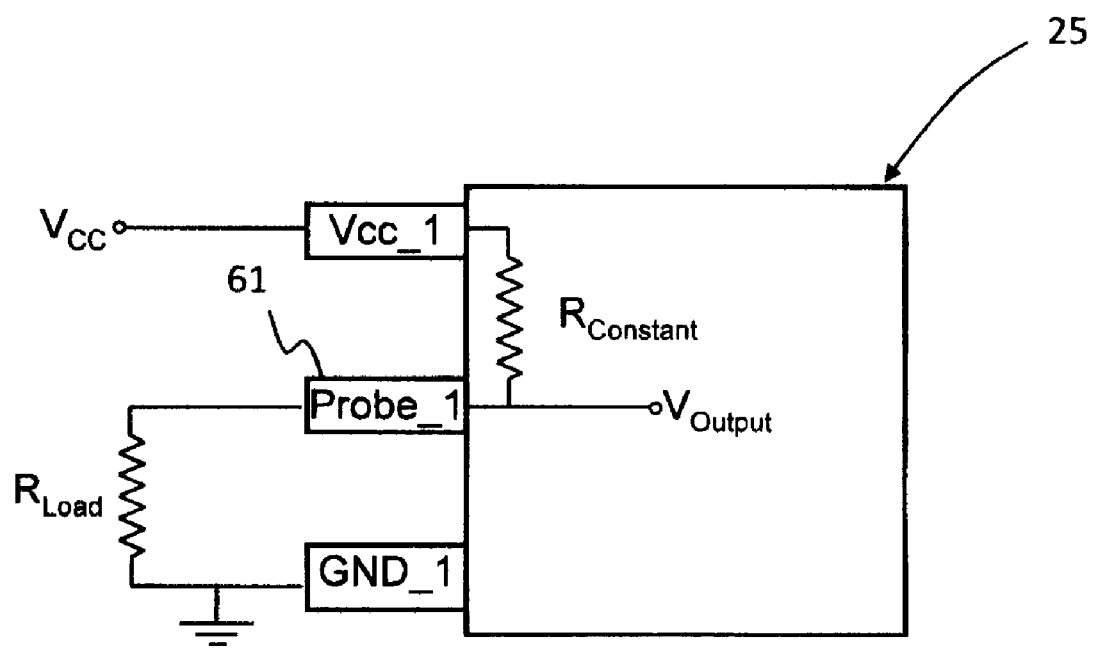

Please refer to FIGS. 7A and 7B, the identification IC 25 includes a plurality of pins 61. When the identification IC 25 connects a load resistor $R_{load}$, one of the resistors 37, by the Probe__1 and GND__1 pins 61 connecting to the first contact 371 and the second contact 372 through the contacts 27, 28, the output voltage signal $V_{Output}$ is varied according to the load resistor $R_{load}$. Therefore, by detecting the output voltage signal $V_{Output}$, the connection relationship of the frame brick 20 and sleeve brick 30a, 30b or 30c is recognized. When the sleeve brick 30a or 30b is installed on different degrees, such as degree 0, 180 or 90, 270, only one of the two resistors 37 of the sleeve brick 30a, 30b will connect to pins 61 of the identification IC 25. Due to the two resistors 37 have different resistance values, the output voltage signal $V_{Output}$ will be different. On the other hand, the identification IC 13 of the rod brick 10 also connects to the identification IC 25 of the frame brick 20. For example, the MSG1__2 pin 61 of the identification IC 25 of the frame brick 20 connects to the MSG1__3 pin of the identification IC 13 of the rod brick 10. The MSG2__2 pin 61 of the identification IC 25 of the frame brick 20 connects to the MSG2__3 pin of the identification IC 13 of the rod brick 10. When detecting the identification IC 25 of the frame brick 20, the connection relationship of the frame brick 20 and rod brick 10 is also recognized. The above example indicates that the third rod unit 12 of rob brick 10 is place in the second hole 21 of frame brick 20. Therefore, the computer system can detects the voltage signals of the identification IC 25 to recognize the connecting relationship.

For example, please refer to follows Table 1:

TABLE 1

| $V_{Output}$ | Type |
| --- | --- |
| 0 V~0.3 V | Couple Sleeve Brick Perpendicular Degree 180 |
| 0.3 V~0.6 V | Couple Sleeve Brick Perpendicular Degree 0 |
| 0.6 V~0.9 V | Couple Sleeve Brick Parallel Degree 180 |
| 0.9 V~1.2 V | Couple Sleeve Brick Parallel Degree 0 |
| 1.2 V~1.5 V | Couple Sleeve brick Rotatable Degree 180 |
| 1.5 V~1.8 V | Couple Sleeve brick Rotatable Degree 0 |
| 1.8 V~2.1 V | Sleeve brick Fixed Degree 270 |
| 2.1 V~2.4 V | Sleeve brick Fixed Degree 180 |
| 2.4 V~2.7 V | Sleeve brick Fixed Degree 90 |
| 2.7 V~3.0 V | Sleeve brick Fixed Degree 0 |
| 3.0 V~3.3 V | Sleeve brick Rotatable |

Because the above structural design, the rod brick 10, the frame brick 20 and the sleeve bricks 30a, 30b, 30c have a unique connection. By recognizing the connection degrees and type of the sleeve bricks 30a, 30b, 30c, the computer system can also recognize the connecting relationship of the rod brick 10, the frame brick 20 and the sleeve bricks 30a, 30b, and 30c. The sleeve brick 30c does not have any resistor due to the sleeve brick 30c is rotatable. When the sleeve brick 30c is installed, the load resistor $R_{load}$ is infinity and hence the output voltage signal is close to $V_{cc}$. Therefore, the computer still can recognize.

Thus, the present invention provides a brick assembly. The computer system detects the identification IC to recognize the connecting relationship by the voltage signals. Moreover, the computer system can establish the 3D physical model or physical simulation according to the connecting relationships.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A brick assembly, comprising:

a rod brick with an irregular polygon-shaped cross-section, having an identification IC (Integrated Circuit) and at least one contact connected to the identification IC (Integrated Circuit) and located on an outer surface of the rod brick;

a sleeve brick, having a circumferential wall defining an internal bore, the internal bore having the same shape with the cross-section of the rod brick to make the rod brick insert into the sleeve brick only in one direction, the sleeve brick comprising:

an inner contact, located on the internal bore for contacting the contact of the rod brick when the rod brick inserting into the sleeve brick;

an outer contact, located on the circumferential wall;

a circular rib, formed on the circumferential wall; and at least one longitudinal protrusion, having a resistor thereon; and a frame brick, having an identification IC (Integrated Circuit) and a plurality of through holes for placing the sleeve brick, each through hole including at least one contact accordance with the outer contact of the sleeve brick;

wherein when the rod brick inserts into the sleeve brick and the sleeve brick places in one of the through hole of the frame brick, the contact of the rod brick contacts to the inner contact of the sleeve brick and the contact of the frame brick contacts to the outer contact of the sleeve brick; signals, caused by the resistor of the sleeve brick, of the identification IC (Integrated Circuit) of the frame brick are detected by a computer system to recognize connecting relationship of the rod brick, the sleeve brick and the frame brick.

2. The brick assembly of claim 1, wherein the cross-section shape of the rod brick is non-symmetrical.

3. The brick assembly of claim 2, wherein the shape is hexagon with one side longer than the other sides.

4. The brick assembly of claim 1, wherein the rod brick comprises a plurality of rod unit, each rod unit has a length equal to the sleeve brick.

5. The brick assembly of claim 4, wherein the rod unit has a contact with a length a little less than half of the length of the rod unit.

6. The brick assembly of claim 1, wherein the frame brick includes two opposite longitudinal concaves on each through hole to allow the sleeve brick placing in two directions.

7. The brick assembly of claim 1, wherein the circular rib of the sleeve brick is near one end.

8. The brick assembly of claim 7, wherein the frame brick includes a circular groove on each through hole to prevent the sleeve brick to misplace.

9. The brick assembly of claim 8, further comprises a rotatable sleeve brick having a circular rib accordance with the circular groove of the frame brick to allow the rod brick rotating when the rod brick inserts into the rotatable sleeve brick and the rotatable sleeve brick places in one of the through hole of the frame brick.

10. The brick assembly of claim 9, further comprises a couple sleeve brick, which combines the rotatable sleeve brick and the sleeve brick, to connect two frame bricks.

11. The brick assembly of claim 1, wherein the sleeve brick includes two longitudinal protrusions locate on two opposite side of the circumferential wall, each longitudinal protrusion has a resistor.

12. The brick assembly of claim 11, wherein the two resistors have different resistance values.

13. The brick assembly of claim 1, wherein the identification IC (Integrated Circuit) of the rod brick is connects to the identification IC (Integrated Circuit) of the frame brick.

* * * * *